US010701369B2

(12) United States Patent
Jobashi

(10) Patent No.: US 10,701,369 B2
(45) Date of Patent: Jun. 30, 2020

(54) DATA TRANSFER CIRCUIT AND DATA TRANSFER METHOD

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventor: Masashi Jobashi, Taito (JP)

(73) Assignees: KABUSHIKI KAISHA TOSHIBA, Minato-ku (JP); TOSHIBA ELECTRONIC DEVICES & STORAGE CORPORATION, Minato-ku (JP)

( * ) Notice: Subject to any disclaimer, the term of this patent is extended or adjusted under 35 U.S.C. 154(b) by 159 days.

(21) Appl. No.: 15/913,320

(22) Filed: Mar. 6, 2018

(65) Prior Publication Data

US 2019/0089963 A1  Mar. 21, 2019

(30) Foreign Application Priority Data

Sep. 19, 2017  (JP) ................................. 2017-179497

(51) Int. Cl.
*H04N 19/164* (2014.01)
*G06F 13/28* (2006.01)

(52) U.S. Cl.
CPC ........... *H04N 19/164* (2014.11); *G06F 13/28* (2013.01)

(58) Field of Classification Search
CPC .... H04N 19/164; G06F 13/28; G06F 13/4221
See application file for complete search history.

(56) References Cited

U.S. PATENT DOCUMENTS

| 5,555,377 | A | 9/1996 | Christensen et al. |
| 7,110,613 | B2 | 9/2006 | Muramatsu et al. |
| 7,418,532 | B2 | 8/2008 | Suzuki et al. |
| 7,424,434 | B2 * | 9/2008 | Chen ................... G10L 19/0017 370/465 |
| 7,711,797 | B1 * | 5/2010 | Huang ................ H04L 67/2847 709/218 |
| 9,525,874 | B2 * | 12/2016 | Nakagawa ........... H04N 21/438 |
| 9,641,566 | B1 * | 5/2017 | Hiremath ............ H04L 65/4084 |
| 10,019,591 | B1 * | 7/2018 | Beguin ................ H04L 63/108 |
| 10,453,221 | B2 * | 10/2019 | Kambhatla ............ H04N 19/17 |

(Continued)

FOREIGN PATENT DOCUMENTS

| EP | 0 662 761 A1 | 7/1995 |
| JP | 2003-115986 | 4/2003 |

(Continued)

OTHER PUBLICATIONS

Duvall, K. et al., "Time Based Compression Selection Line Detector Methodology" ip.com, vol. 35, No. 6, XP013098457, Nov. 1992, 2 pages.

*Primary Examiner* — Xuemei G Chen
(74) *Attorney, Agent, or Firm* — Oblon, McClelland, Maier & Neustadt, L.L.P.

(57) ABSTRACT

A data transfer circuit including: a measurement circuit that measures a transfer time of transfer data; a data processing circuit that is connected to the measurement circuit, and that, when the transfer time exceeds a threshold, performs lossy compression to reduce a data volume; and a control circuit that is connected to the data processing circuit, and that performs control to transfer data.

8 Claims, 8 Drawing Sheets

(56) References Cited

U.S. PATENT DOCUMENTS

| | | | |
|---|---|---|---|
| 2007/0075999 A1* | 4/2007 | Benjamin | G06F 19/321 |
| | | | 345/428 |
| 2007/0230561 A1 | 10/2007 | Ichieda | |
| 2010/0095116 A1* | 4/2010 | He | H04L 9/065 |
| | | | 713/168 |
| 2013/0202044 A1 | 8/2013 | Kitamura et al. | |
| 2014/0026057 A1* | 1/2014 | Kimpton | G06F 9/451 |
| | | | 715/733 |
| 2014/0181682 A1* | 6/2014 | Spracklen | G06F 3/1454 |
| | | | 715/740 |
| 2014/0334553 A1* | 11/2014 | Novotny | H04N 19/115 |
| | | | 375/240.26 |
| 2015/0229960 A1* | 8/2015 | Yamasaki | H04N 19/593 |
| | | | 375/240.12 |
| 2018/0151150 A1* | 5/2018 | Volpi | G06F 3/1454 |
| 2018/0219934 A1* | 8/2018 | Gomes | H04L 65/607 |

FOREIGN PATENT DOCUMENTS

| | | |
|---|---|---|
| JP | 2003-122709 | 4/2003 |
| JP | 2009-245005 | 10/2009 |
| JP | 2015-141528 | 8/2015 |

* cited by examiner

DATA TRANSFER CIRCUIT AND DATA TRANSFER METHOD

CROSS-REFERENCE TO RELATED APPLICATIONS

This application is based upon and claims the benefit of priority from Japanese Patent Application No. 2017-179497, filed on Sep. 19, 2017, and the entire contents of which are incorporated herein by reference.

FIELD

Embodiments described herein relate to a data transfer circuit and a data transfer method.

BACKGROUND

Nowadays, it is becoming more popular to use a computer by incorporating another small computer, such as an accelerator, therein rather than to use a computer independently.

As an application of an incorporated system, for instance, a circuit dedicated for image processing is mounted on a computer, or an incorporated device makes calculations using data having a large volume, such as big data.

In such cases, it is desirable that a sufficiently large bus width be provided between the computer and an incorporated device, and a sufficient transfer speed of data be ensured.

However, even when the performance of the incorporated device is high, there are cases that it is difficult to provide a sufficiently large bus width, which makes it difficult for the bus to achieve a sufficient transfer speed particularly when large data is to be treated.

In addition to the bus width, some other causes may lead to an insufficient transfer speed. Meanwhile, when large data, particularly large image data, is used, it is not known whether or not all the data is necessary for calculation, and there is a possibility that transfer of unnecessary data is performed. A Similar problem occurs in not only the relationship between a main computer and an incorporated system, but also transfer between architectures within the incorporated system, for instance, transfer between a module specialized for filter processing and a memory module.

DETAILED DESCRIPTION

Hereinafter, embodiments will be described with reference to the drawings. These embodiments are not limiting.

Figure 1:
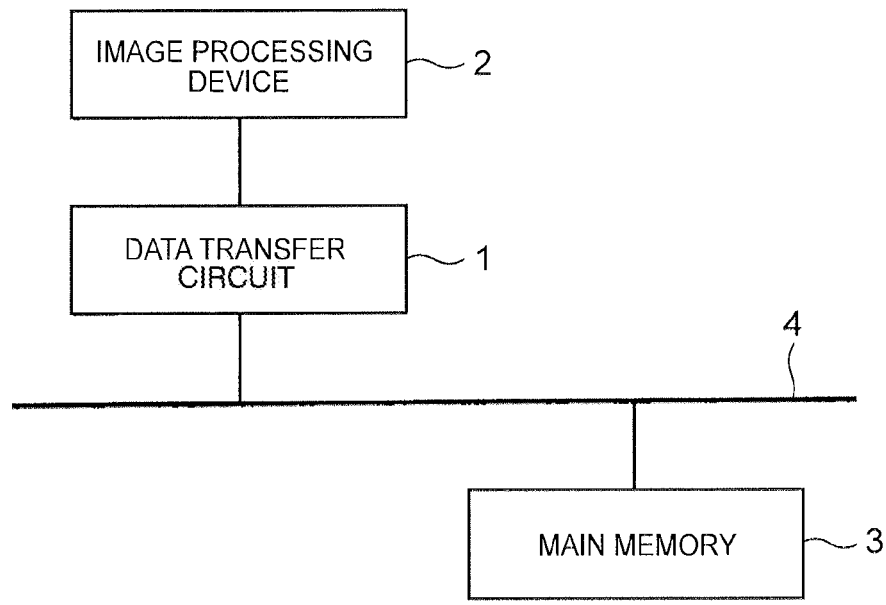
FIG. 1 is a diagram illustrating an example of use of a data transfer circuit according to an embodiment.

FIG. 1 is an example of use of a data transfer circuit according to the embodiments described below. A data transfer circuit 1 is provided between an image processing device 2 and a bus 4. The image processing device 2 may be built in a computer including a microprocessor, or may be incorporated in a computer. The bus 4 is for performing communication between the image processing device 2 and a main memory 3 in the computer.

For transfer of image data to be processed by the image processing device 2, the data transfer circuit 1 controls data transfer from the main memory 3 to the image processing device 2 and data transfer from the image processing device 2 to the main memory 3. Although a description will be given with the image processing device 2 provided in the following, the device is not limited to an image processing device, for instance, transfer between another incorporation-based device that handles big data or the like and the main memory 3 may be controlled. For transfer in the bus 4, the type and the method do not particularly matter. For instance, direct memory access (DMA) transfer may be performed, or transfer using other protocols may be performed.

Although the data transfer circuit 1 is separately provided from the image processing device 2 in FIG. 1, the data transfer circuit 1 may be provided in the image processing device 2, and when image data is transmitted and received in the image processing device 2, the data transfer circuit 1 may control transfer of the image data.

First Embodiment

The data transfer circuit 1 according to this embodiment controls data transfer by reducing the data volume of image data for one frame to be transferred subsequently based on the transfer time of image data for one frame in the past, thereby aiming to ensure a sufficient transmission speed.

Figure 2:
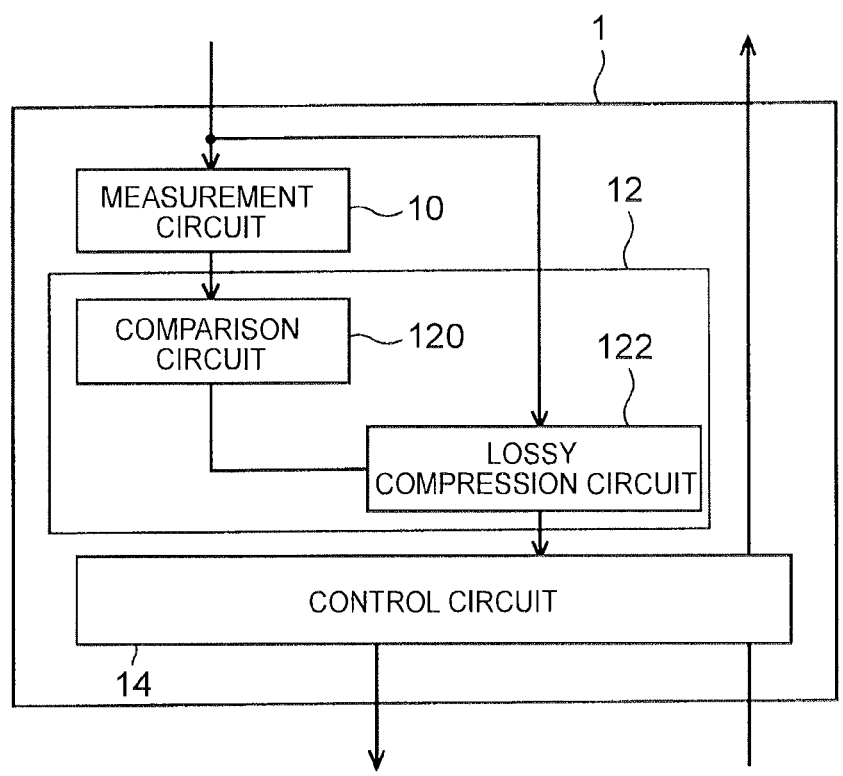
FIG. 2 is a block diagram of the data transfer circuit according to an embodiment.

FIG. 2 is a block diagram illustrating the function of the data transfer circuit 1 according to this embodiment. The data transfer circuit 1 includes a measurement circuit 10, a data processing circuit 12, and a control circuit 14. Hereinafter, a case will be described in which image data outputted from the image processing device 2 is transferred from the control circuit 14 to the main memory 3 via the measurement circuit 10 and the data processing circuit 12.

The measurement circuit 10 is a circuit that is connected to the image processing device 2, and that measures a transfer time of the transfer of data for one frame which is outputted by the image processing device 2, and for example can be microprocessor and/or analog circuit implemented or implemented by a dedicated circuit. The transfer time refers to the time taken for transfer of data to be transferred (hereinafter referred to as transfer data). The transfer time is measured based on the timings at which the data transfer circuit 1 starts and ends transmission of the transfer data. In another example, the transfer time may be defined as a response time from the start of transfer of data until notification of completion of the transfer of data is made.

In an instance in which the data transfer circuit 1 and the computer including the main memory 3 are synchronized in time, the transfer time is measured by calculating the difference between the time at which the data transfer circuit 1 starts to transmit the transfer data, and the time notified by the computer including the main memory 3 as an end time of the transfer of the data. In another example, the start and the end of transmission of transfer data may be detected and measured by the data transfer circuit 1. In this case, the measurement circuit 10 may be directly connected to the computer having the main memory 3 and be enabled to receive data such as time data from the computer.

The data processing circuit 12 is a circuit that is connected to the measurement circuit 10, and that, when a transfer speed is slow or the bandwidth of the bus 4 used for transfer is tight, processes data such that the data volume of the transfer data is adjusted (mainly reduced). The data processing circuit 12 includes a comparison circuit 120, and a lossy compression circuit (irreversible compression circuit) 122, and also can be microprocessor and/or analog circuit implemented or implemented by a dedicated circuit.

The comparison circuit 120 is a circuit that is connected to the measurement circuit 10, and that compares a threshold value with the transfer time of a past frame measured by the measurement circuit 10, and outputs a result of the comparison. The threshold value used for the comparison may be a threshold value having a certain value determined in advance, or may be a threshold value determined by the transfer time of past frames.

The certain value determined in advance may be determined according to various types of image processing performed by the image processing device 2. For instance, in certain processing, when 30 frames per second (fps) is necessary, a threshold value of 3 msec may be determined, and in another processing, when 60 fps is necessary, a threshold value of 1 msec may be determined. These numerical values are examples and not limiting. Alternatively, these numerical values may be dynamically changed by processing of the image processing device 2 or a computer connected to the image processing device 2. In this case, the comparison circuit 120 is configured to be able to change the threshold value based on a request from the image processing device 2 or the computer.

In the case that a threshold value is changed by the transfer time of past frames, for instance, a threshold value is determined as follows. Specifically, in past transfers when the same processing was performed, it is determined whether there is a frame in which a time for a series of processing including processing of the image processing device 2 and transfer processing failed to satisfy a requested speed. If there is such an unsuccessfully processed frame, the threshold value is determined based on the transfer speed of the unsuccessfully processed frame, and a normally processed frame. In an example, the shortest transfer time in unsuccessfully processed frames compared with the longest transfer time in normally processed frames, and the threshold value may be set to the average value of the transfer time if the longest transfer time of the normally processed frame is shorter than the other transfer time. In another example, the threshold value may be set to the longest transfer time among the transfer times in the normally processed frames.

As another example of determining a threshold value from the past frames, a change in the transfer time of a plurality of past frames may be considered. For instance, when the transfer time of a predetermined number of past frames tends to increase, and an increase amount is large, a subsequent transfer prediction time may be calculated from a variation amount in the transfer time, and is used as a threshold value. As an example, the transfer time of a predetermined number of past frames may be linearly approximated, a transfer prediction time of the subsequent frame is estimated, and a threshold value may be changed. The transfer prediction time is not simply used as a threshold value, and for instance, an increased value from the current threshold value may be calculated using ½ of the slope of the past transfer time, and the threshold value may be increased based on the increased value. The value of ½ has been presented as an example and is not limiting. For instance, a threshold value may be calculated based on an increased rate of 10% (1/10). Alternatively, a threshold value may be calculated by applying a simple model such as regression analysis not by linear approximation.

As still another example, although the processing itself of a predetermined number of past frames has been processed with a requested speed, when a relatively long time is taken, for instance, the transfer times of the frames exceed the threshold value for another predetermined number of frames, or exceed 80% of the threshold value, the average value of the transfer times taken for another predetermined number of frames may be used as a threshold value. Alternatively, instead of using the average value itself as a threshold value, a threshold value may be calculated by giving a certain margin, adding a predetermined value (for instance, 5 msec) to the average value, or multiplying the average value by a predetermined times (for instance, 1.1 times).

The lossy compression circuit 122 is a circuit that is connected to the image processing device 2 and the comparison circuit 120, and that reduces the data volume of transfer data by performing lossy compression (irreversible compression) on the transfer data. The lossy compression is performed, for instance, by deleting reserved bits unrelated to data on image information in transfer data, creating a reduced image, or performing lossy compression (for instance, compression by a technique of compressing images such as JPEG or compression by a technique of compressing data not limited to images) using an arithmetic coding system. Also, when the data on image information of 12 bits is obtained for instance, lower bits may be not as important. In such a case, the data may be reduced by not transferring the 4 lowest bits of the data on image information of 12 bits, or setting the 4 lowest bits to 0 and applying run-length coding.

When data bits have 16 bits, reserved bits may be 4 bits, and information bits may be 12 bits, for instance, and 16-bit data can then be reduced to 8-bit data by deleting the above-mentioned reserved bits and the lowest 4 bits. When bits are deleted, at a transfer destination, data may be restored to the original size, for instance, by applying 0 padding to the data, or processing is performed on data as it is. When image reduction or arithmetic coding is performed, the data may be expanded at the destination where the transfer data received. The expansion allows processing to be performed or an output to be made.

The control circuit 14 circuit that is connected to the main memory 3 via the lossy compression circuit 122, that is, the data processing circuit 12, and the bus 4, and that performs control of transfer based on the output of the data processing circuit 12, and can be microprocessor and/or analog circuit implemented or implemented by a dedicated circuit. As described above, when the lossy compression is performed, for instance, the control circuit 14 performs control to transfer compressed data outputted by the data processing circuit 12 to the main memory 3.

When transfer data with reduced data volume is received from the main memory 3, the data transfer circuit 1 may perform control such that a data portion with the data volume reduced in the transfer data is restored to the original data, and the original data thus obtained is outputted to the image processing device 2. In this manner, it is possible to transfer image data with the same data volume as that of the original image to the image processing device 2. For the case of restoring data, the data transfer circuit 1 may be configured to obtain a data reduction technique from the circuit which reduces the data volume, and thereby be enabled to restore the data as described above.

Figure 3:
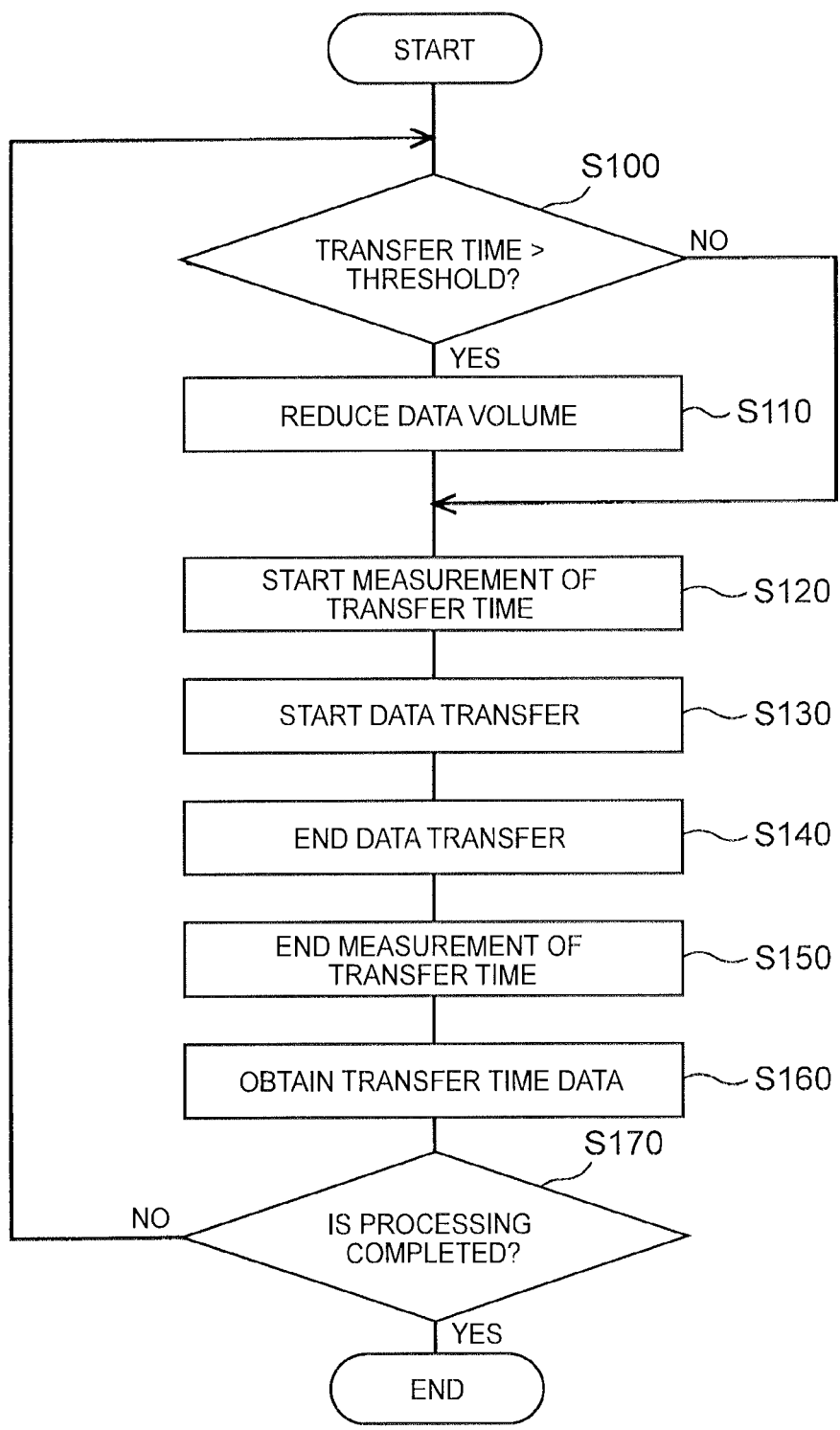
FIG. 3 is a flowchart illustrating the processing of the data transfer circuit according to an embodiment.

Next the processing performed by the data transfer circuit 1 will be described with reference to the flowchart of FIG. 3. FIG. 3 is a flowchart illustrating the flow of processing of the data transfer circuit 1 according to this embodiment.

First, the comparison circuit 120 compares a past transfer time with a threshold value, and determines whether or not the past transfer time is greater than the threshold value (step S100). Here, for instance, when the same processing is continuously performed by the image processing device 2, the past transfer time refers to the transfer time of the transfer for one previous frame. When the same processing is not continuously performed, the past transfer time may be the transfer time of the latest frame for which the same processing has been performed, or simply the transfer time of one previous frame.

For the case of processing the first frame, no past transfer time may be stored for the comparison, thus processing is performed with a determination result of No in S100. Alternatively, for the case of the first frame, comparison processing may be automatically omitted, or the processing in step S100 may be performed after transfer. In other words, the processing in step S100 to step S110 may be performed after the processing in step S170.

When the past transfer time exceeds a threshold value (Yes in step S100), the data processing circuit 12 reduces the data volume of the transfer data by the lossy compression (step S110).

On the other hand, when the past transfer time does not exceeds a threshold value (No in step S100), it is determined that reduction of the data volume is unnecessary, and the data volume reduction processing is skipped.

Subsequently, the measurement circuit 10 starts measurement of a transfer time (step S120). The measurement of the transfer time is started, for instance, by writing the time at which measurement is started or the value of a clock, in a register.

Subsequently, the control circuit 14 starts transfer of data (step S130). The data to be transferred is data with a reduced data volume or the unprocessed transfer data in accordance with the determination in step S100.

Subsequently, when the transfer of the data is completed, the control circuit 14 completes data transfer processing (step S140). When data of the subsequent frame is present at this timing, the control circuit 14 may continuously start data transfer processing of the subsequent frame.

Subsequently, the measurement circuit 10 completes measurement of a transfer time at the timing of the end of the transfer of data (step S150). At this end timing, the time at which measurement is ended or the value of a clock may be written in the register, or the processing in the next step may be continuously performed using the obtained time or value of the clock.

Subsequently, the measurement circuit 10 obtains transfer time data by subtracting the time of the start of measurement from the time of the end of measurement (step S160). Alternatively, tie obtained transfer time may be converted to a transfer time to be required for the original data volume for one frame based on the reduction in the data volume. As another method, the obtained transfer time may be converted to a transfer time per bit by being divided by the data volume transferred. When a transfer time per bit is obtained, the threshold value is also set to a threshold value per bit. Under such normalization, in comparison with a threshold value used as a target for comparison in step S100, comparison is made in terms of time taken to transfer data with the same data volume. For instance, when the number of ticks is counted to measure a time, subtraction processing is unnecessary, and it is sufficient that the counted number of ticks be obtained. When the number of ticks obtained, a threshold value may also be expressed in terms of the number of ticks, so that the numbers of ticks may be compared with each other.

Subsequently, it is determined whether or not a frame to be processed is continuously inputted, in other words, whether or not the processing is completed (step S170).

When the processing by the image processing device 2 is completed, that is, transfer of a further frame is unnecessary (Yes in step S170), the processing by the data transfer circuit 1 is also completed. When the processing is not completed (No in step S170), the flow returns to step S100 and the processing is continued.

Figure 4:
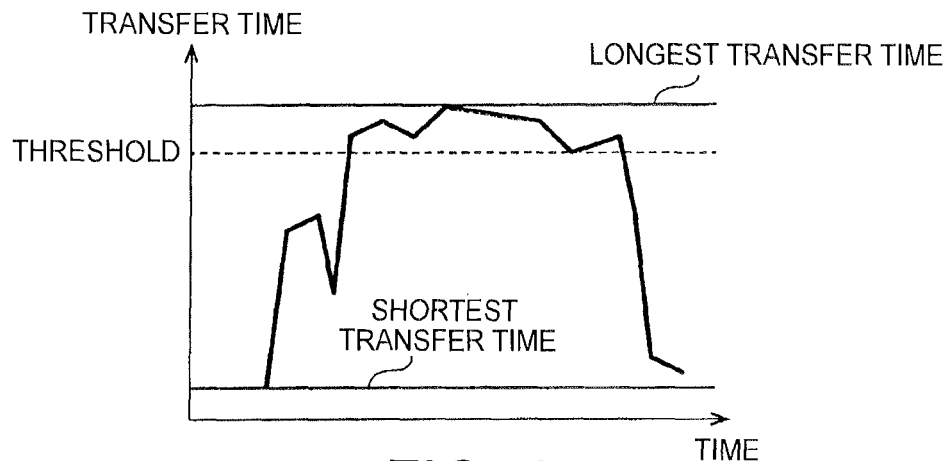
FIG. 4 is a graph illustrating an example of a transfer time according to an embodiment.

FIG. 4 is a graph in which the transfer time for N frames is obtained. Variation occurs in the transfer time of data transfer. Given this situation, also when the transfer time is larger compared with the threshold value, data reduction does not necessarily need to be performed with the same compression rate. Thus, the compression rate may be changed based on the difference between the transfer time and the threshold value.

When the transfer time exceeds a threshold value THRESHOLD in FIG. 4 at the timing of comparison of the transfer time with a threshold value, the comparison circuit 120 of the data processing circuit 12 may calculate the value of $\Delta T$=(transfer time)−(threshold value), and transmit the value to the lossy compression circuit 122. As another example, the comparison circuit 120 may calculate the value of $\Delta T$, and may determine whether the transfer time is longer than a threshold value by checking the positive or negative of this value. In this case, it is unnecessary to calculate difference after the comparison, thus it is also possible to reduce the number of instructions related to the calculation.

The lossy compression circuit 122 may change a compression ratio according to the size of $\Delta T$. For instance, when the bits of information data are deleted, the length of the bits to be deleted may be changed according to the size of $\Delta T$. When compression is performed by arithmetic coding such as JPEG, a quantization rate may be changed.

In this manner, a compression ratio is changed based on the difference between the transfer time and the threshold value, and thus data volume to be transferred is changed for each frame according to the variation in the transfer time, and consequently, when the transfer time is not so long, the accuracy of an image can be ensured, whereas when the transfer time is long, it is possible to transfer data with emphasis on acquisition of an image to be processed.

Figure 5A:
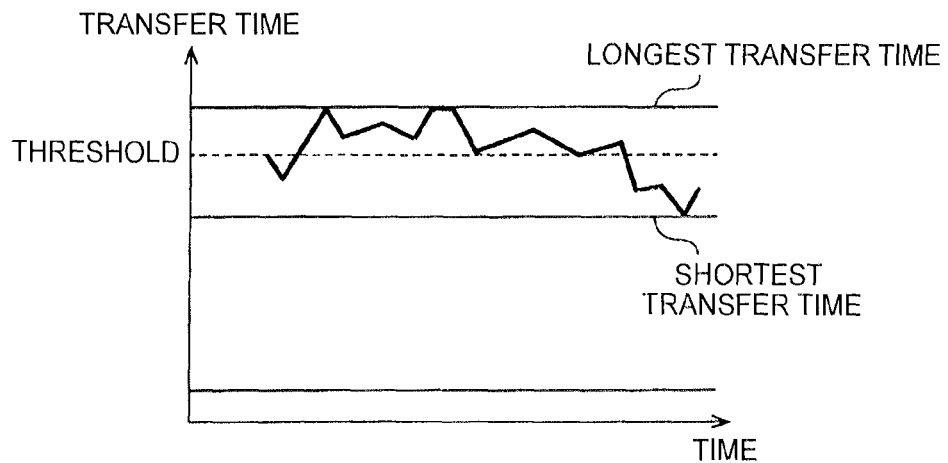
FIGS. 5A and 5B are graphs each illustrating another example of the transfer time according to an embodiment.
Figure 5B:
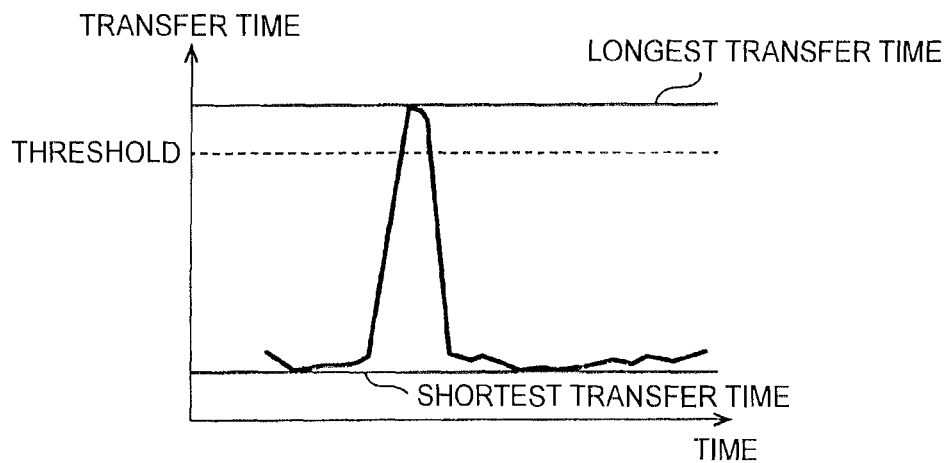

FIGS. 5A and 5B are graphs each illustrating another example of the transfer time. FIG. 5A is graph illustrating the state of the transfer time when there is a relatively smaller difference between a maximum value and a minimum value of transfer time, that is, a smaller difference between the longest transfer time and the shortest transfer time in a predetermined number of past frames, for instance, in the N latest frames. When the difference between the longest transfer time and the shortest transfer time is smaller as in FIG. 5A, it is probable that the transfer speed is regularly insufficient.

Thus, when the difference between the longest transfer time and the shortest transfer time is smaller, data may be processed such that the reduction in the data volume, that is, the compression rate by the lousy compression circuit 122, is increased.

In contrast, FIG. 5B is a graph illustrating an example in which the difference between the longest transfer time and the shortest transfer time is relatively larger. When the difference between the longest transfer time and the shortest transfer time is larger, the transfer time may be temporarily longer. Thus, when the difference between the longest transfer time and the shortest transfer time is larger as in FIG. 5B, data may be processed such that the reduction in the data volume, that is, the compression rate by the lossy compression circuit 122, is decreased.

For an example in which the difference between the longest transfer time and the shortest transfer time is larger, various causes for the state of the transfer time may be considered. Thus, the compression ratio may be separately determined based on a profile result rather than reducing the compression ratio uniformly as described above. For instance, when the shortest transfer time is temporarily reduced, it is probable that the transfer speed is regularly insufficient, thus in this case the compression ratio may be increased.

In this manner, the data volume to be reduced may be adjusted by changing the compression rate based on the transfer time. Specifically, the compression rate may be decreased for a larger difference between the transfer time and the threshold value and/or the compression rate may be increased for a smaller difference between the longest transfer time and the shortest transfer time.

A predetermined number of frames, which is the number of frames for obtaining the longest transfer time and the shortest transfer time, may be a number that has been set in advance. For instance, the predetermined number may be 10, or may be the number of frames in 10 seconds. Alternatively, the number of frames may be dynamically changed according to processing. For instance, the predetermined number may be dynamically changed according to necessary fps (frames per second) for each image processing.

According to the embodiment, a data transfer circuit and a data transfer method that reduce a data volume in transfer of data can be obtained. According to this embodiment, the transfer time of transfer is measured for each frame, and data is compressed based on the measured result, thereby making it possible to ensure the transfer speed of image data necessary for image processing in the image processing, device 2 or the data processed by the image processing device 2. As a consequence, the possibility of a tight bandwidth is reduced, and data used for image processing is smoothly exchanged, and thus delay of the processing itself can be reduced.

In the description above, a case has been described in which the data of the image processing device 2 is transferred to the main memory 3. However, without being limited to this, in the configuration of FIG. 1, similar processing can be performed for the reverse operation, that is, transfer of the data from the main memory 3 to the image processing device 2. In this case, the measurement circuit 10 and the data processing circuit 12 of FIG. 2 are connected to the main memory 3, and the data processing circuit 12 is connected to the image processing device 2 via the control circuit 14.

Furthermore, the data transfer circuit 1 may be provided for each of reading and writing. In this manner, when the image processing device 2 performs reading and/or writing of data, appropriate image data can be transferred.

(Modification of First Embodiment)

Although a case has been described above in which lossy compression is performed on all the image data, the embodiment is not limited to this.

Figure 6:
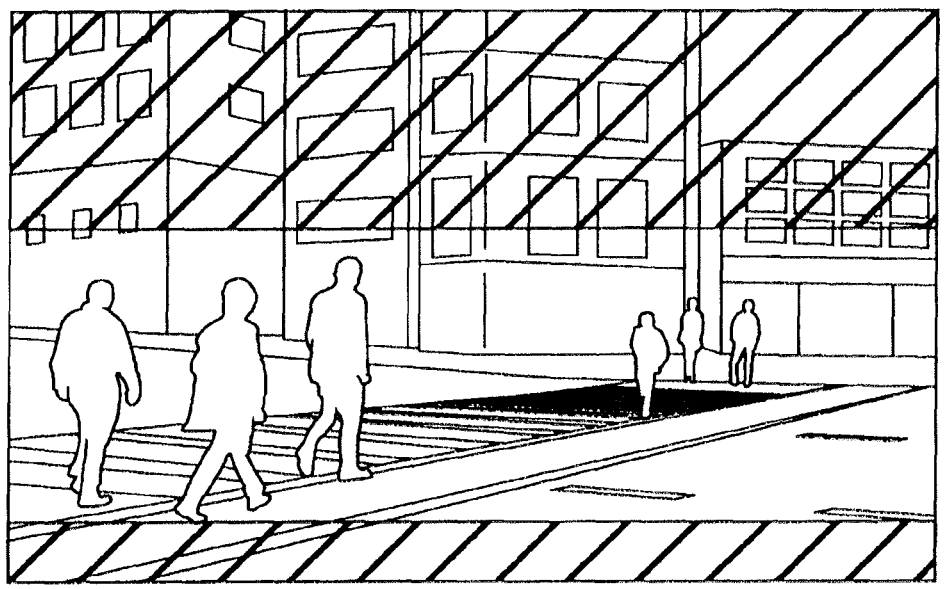
FIG. 6 is an image illustrating an example image with a reduced data volume according to an embodiment.

FIG. 6 is an example in which an image taken by an in-vehicle camera is used as an instance of image data outputted and inputted. One of the objectives of an in-vehicle camera is to secure safety of driving, and in this case, the area necessary for image processing or image analysis is limited. For instance, the conditions of roads, information on other vehicles, humans, bicycles moving on roads, etc. are important.

In such a case, as illustrated in FIG. 6, an image related to an upper image area which is part of the sky or lower image area which is the hood of the vehicle in which the image processing device 2 is mounted often has no particularly important information. In such a case, the necessity of transferring the information on the entire image is not so high.

Thus, in this modification, when the bandwidth for transferring has a margin, all the data of the image is transferred, but when there is no margin the bandwidth, data is reduced for the area that is less important. The lossy compression circuit 122 obtains information on the area with less importance from the image processing device 2, and may perform the lossy compression on the data in the low importance area only.

In this manner, data with high accuracy is transferred to an area on which image processing or analysis is desired to be performed by the image processing device 2, and compressed data can be transferred to the rest of the area.

The area for which data is not compressed may be changed according to, for example, the conditions of roads, and conditions of the vehicle. For instance, when the vehicle is going down a hill, information on an upper portion of the image may be necessary in a wider range, as compared with the case in which the vehicle is running on a flat road. In such a case, a data reduction area in an upper portion of the image may be narrowed. The area may be set for each frame. The area may be set, for instance, based on the information received from an automobile via a controller area network (CAN), or by determining a condition while image processing is performed.

As described above, according to this modification, for an area on which image processing or analysis is performed, the transfer speed can be ensured with the accuracy ensured according to the state of the bandwidth. As in the first embodiment described above, the compression ratio may be changed based on the difference between the transfer time and the threshold value or the difference between the longest transfer time and the shortest transfer time. Furthermore, in this modification, the reduction in the data volume may be adjusted by changing not the compression ratio but the area to be compressed.

Setting of the area is not limited to what has been shown in FIG. 6. For instance, when an image for an automobile is provided, a direction in which a human is moving is predicted, and data with high accuracy is left in a range including the area, and data may be reduced in the rest of the area. It is possible to apply setting of the area to image data other than for an automobile, and for instance, in the case of a monitoring camera, an area where any problem probably does not occur may set as a low importance area, and data may be reduced in that low importance area. Needless to say, this modification is applicable to transfer of general data in addition to image data.

Second Embodiment

In the first embodiment described above, the transfer speed is ensured by compressing data using the lossy compression circuit 122. However, in this second embodiment, the transfer speed is ensured by imposing restrictions on data transfer itself depending on an area.

Figure 7:
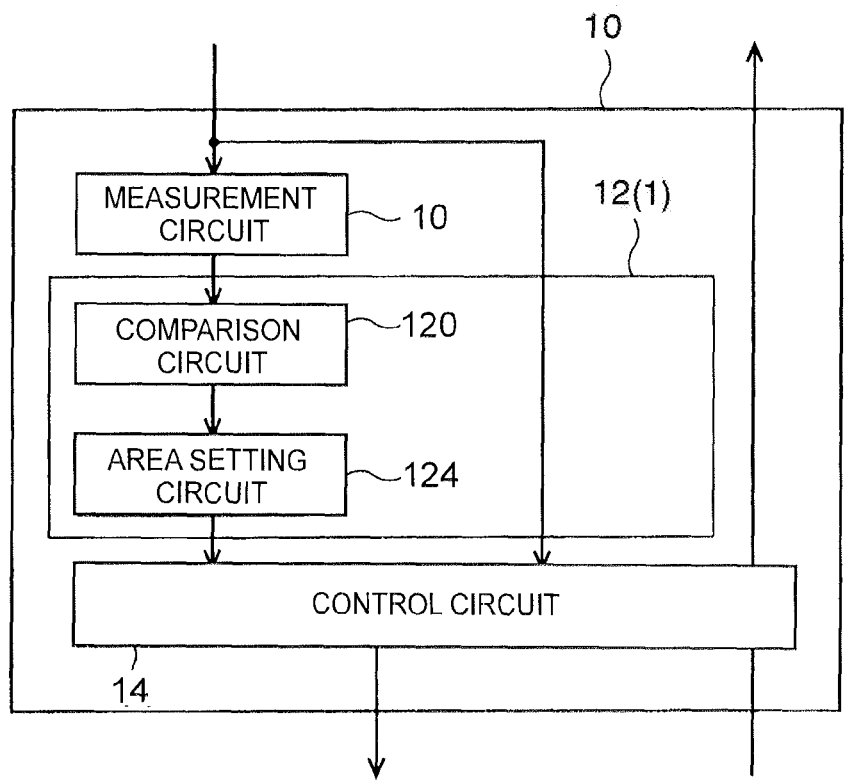
FIG. 7 is a block diagram of the data transfer circuit according to an embodiment.

FIG. 7 is a block diagram of the data transfer circuit 10 according to this embodiment. As illustrated in FIG. 7, the data transfer circuit 10 according to this embodiment includes an area setting circuit 124 instead of the lossy compression circuit 122 as in the first embodiment described above in the data processing circuit 12(1), and can be microprocessor and/or analog circuit implemented or implemented as a dedicated circuit.

The area setting circuit 124 is a circuit that, when unimportant areas are present in an image as illustrated in FIG. 6, sets the areas as the area for which no data is transferred. As another example, the area setting circuit 124 may a circuit that sets areas other than the unimportant areas as the area for which data is transferred. In this embodiment, the data processing circuit 12(1) sets an area, and outputs information on the area to the control circuit 14, and performs the output such that the data volume of transfer data is reduced. In this embodiment, reduction in the data volume of transfer data is a concept that includes reduction in the data volume of transfer data achieved such that when the control circuit 14 transfers data, an area for which no data is transferred or an area for which data is transferred is set in a frame, and as a consequence, the data volume of the transfer data is reduced.

The control circuit 14 controls transfer of the transfer data based on the areas set by the area setting circuit 124. When the area setting circuit 124 sets an area for which no data is transferred, the control of the transfer data is performed such that a transfer command is not issued for the area, and data for the rest of the area is transferred. On the other hand, when the area setting circuit 124 sets an area for which data is transferred, a transfer command is not issued for the rest of the area, and data for the set area is transferred.

Figure 8:
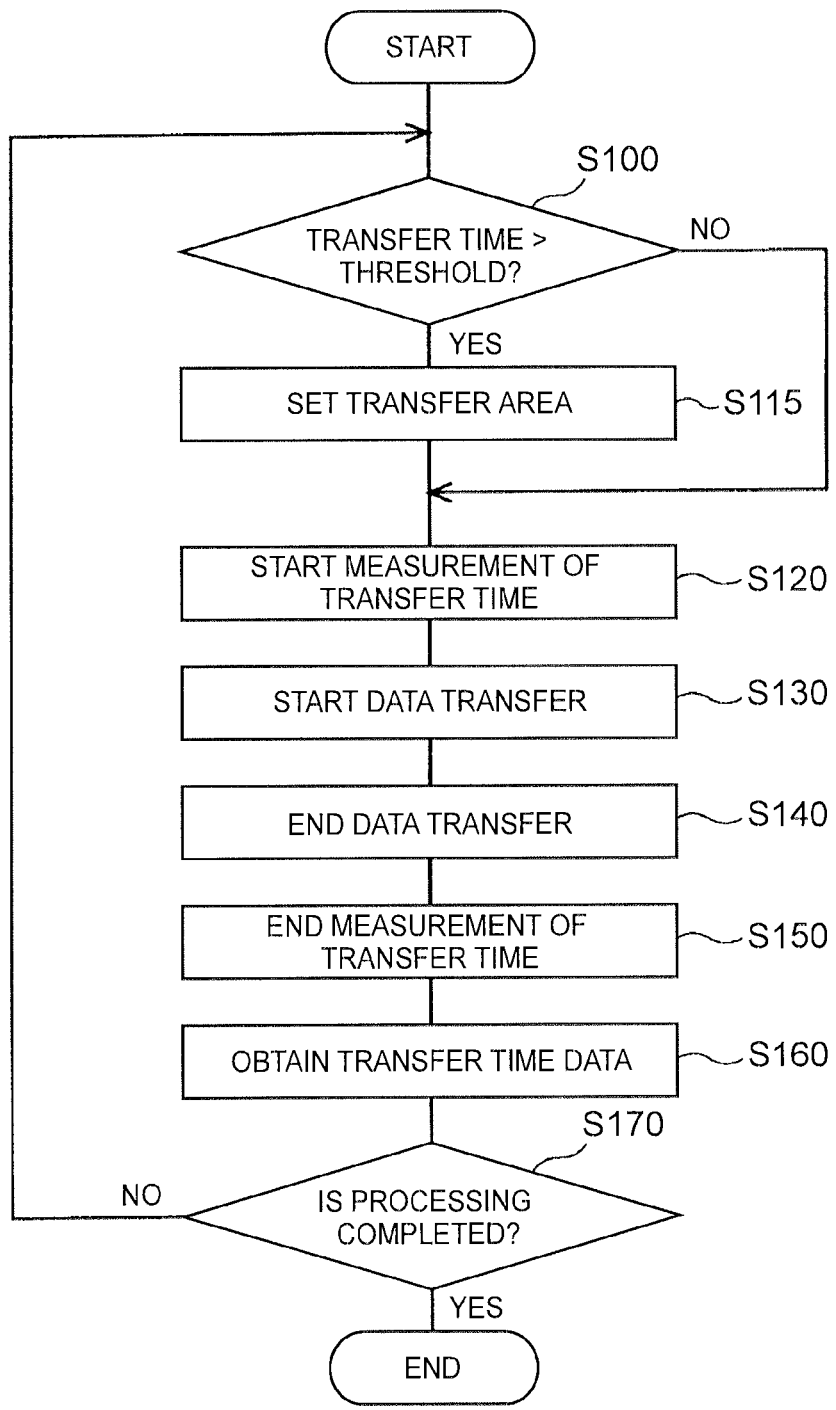
FIG. 8 is a flowchart illustrating the processing of the data transfer circuit according to an embodiment.

FIG. 8 is a flowchart illustrating the processing of the data transfer circuit 10 according to this embodiment. The data volume reduction processing (step S110) in the processing according to the first embodiment illustrated in FIG. 3, that is, the processing for performing lossy compression on the transfer data, is changed to processing (step S115) for setting an area for which data is not transferred or transferred.

In this embodiment, the data volume to be transferred is reduced by setting an area for transfer as described above in data transfer start processing (step S130).

As described above, according to this embodiment, an area for which data is not transferred or an area for which data is transferred is set in the transfer data by the data processing circuit 12, and the control circuit 14 transfers data based on the set area, thereby taking it possible to reduce the data volume of the data to be transferred, and to ensure the transfer speed.

In this embodiment, actual data reduction is achieved not by compression, but processing of imposing restrictions on data transfer, and thus the transfer data can be reduced without spending processing time taken for compression and using a processing capability for compression. For transfer in which data is reduced, a protection circuit or the like, which protects against writing data to a write-protected area, such as a system area on a memory, may be utilized. Specifically, transfer may be prohibited by imposing restrictions on issuing an access command to access a memory within the area in which image information is stored, on the main memory 3 or a memory in the image processing device 2.

Figure 9:
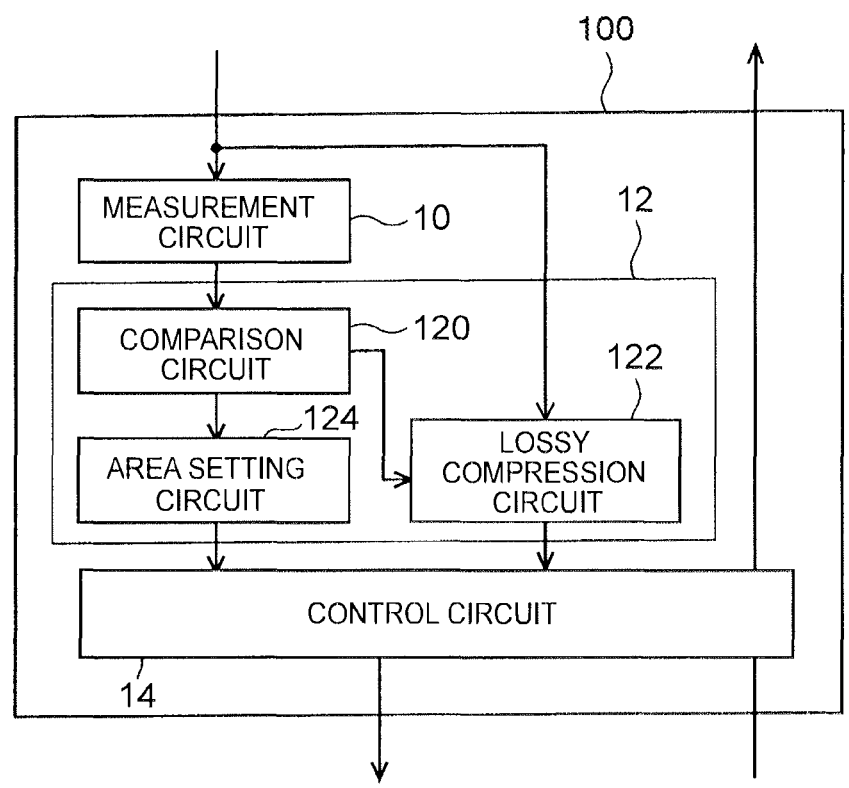
FIG. 9 is a block diagram of the data transfer circuit according to an embodiment.

FIG. 9 is a diagram illustrating the data processing circuit 12 in a configuration of a data transfer circuit 100 including both the lossy compression circuit 122 according to the first embodiment described above, and the area setting circuit 124 according to this embodiment. As illustrated in FIG. 9, the data processing circuit 12 may include the lossy compression circuit 122 and the area setting circuit 124, and may use these two circuits selectively according to the data volume to be reduced.

Specifically, when the reduction in the data volume does not have to be so large, the lossy compression is performed on an area for which transfer is not so important by the lossy compression circuit 122. When a sufficient transfer speed cannot be ensured by the lossy compression, the area setting circuit 124 outputs area information to the control circuit 14, and the transfer speed may be ensured by imposing restrictions on the area to be transferred by the control circuit 14. For the switching between the circuits, a second threshold value other than the threshold value described above may be set.

In all the embodiments described above, for instance, the expression "the transfer time 'exceeds' a threshold value" has been used, and this can also be read as "is greater than or equal to", In other words, a case has been described in which processing is branched under the conditions: (transfer time)>(threshold value) and (transfer time)≤(threshold value). However, processing may be branched under the conditions: (transfer time)≥(threshold value) and (transfer time)<(threshold value). This also applies to the expressions for comparison other than the comparison above.

In all the embodiments described above, all the circuits may be formed by analog circuits, or formed by digital circuit, or analog circuits and digital circuits in a mixed manner. Furthermore, each circuit may be formed by a dedicated circuit such as an integrated circuit (IC), an application specific integrated circuit (ASIC) or a field-programmable gate array (FPGA). Part of all of the functions may be controlled by a program, and information processing by software may be specifically implemented using hardware resources.

Next, an application example of the above embodiments is described.

Figure 10:
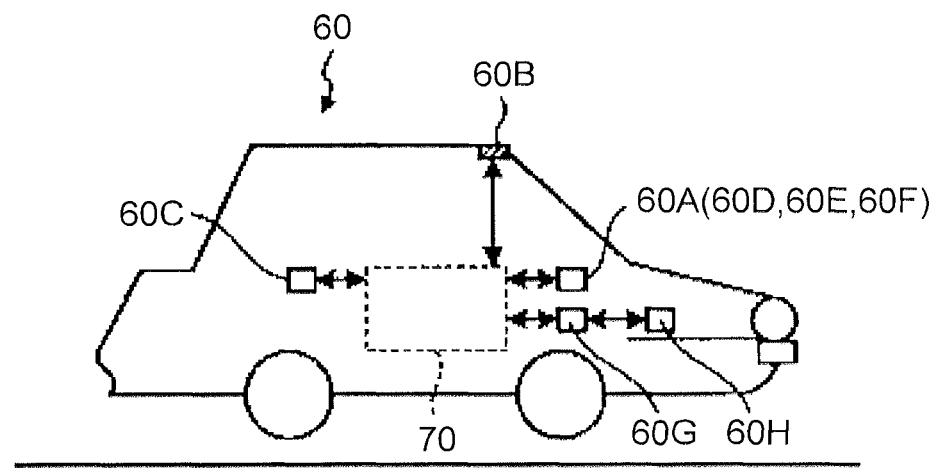
FIG. 10 is a diagram illustrating an example of a mobile object.

FIG. 10 is a diagram illustrating an example of a mobile object 60 according to the present embodiment.

The mobile object 60 includes an image processing 70, an output unit 60A, a sensor 60B, an input device 60C, a power controller 60G, and a power unit 60H.

The mobile object 60 is, for example, a vehicle (motorcycle or automobile), a robot, a ship, an airplane, etc. The mobile object 60 for example, a mobile object capable of traveling (autonomous driving) without intervention of human driving operation, that is, for example, an autonomous car. The image processing LSI 70 is not limited to a type mounted on the mobile object 60. The image processing LSI 70 may be installed on a stationary object such as a guard rail, a pool, a traffic sign etc.

Figure 11:
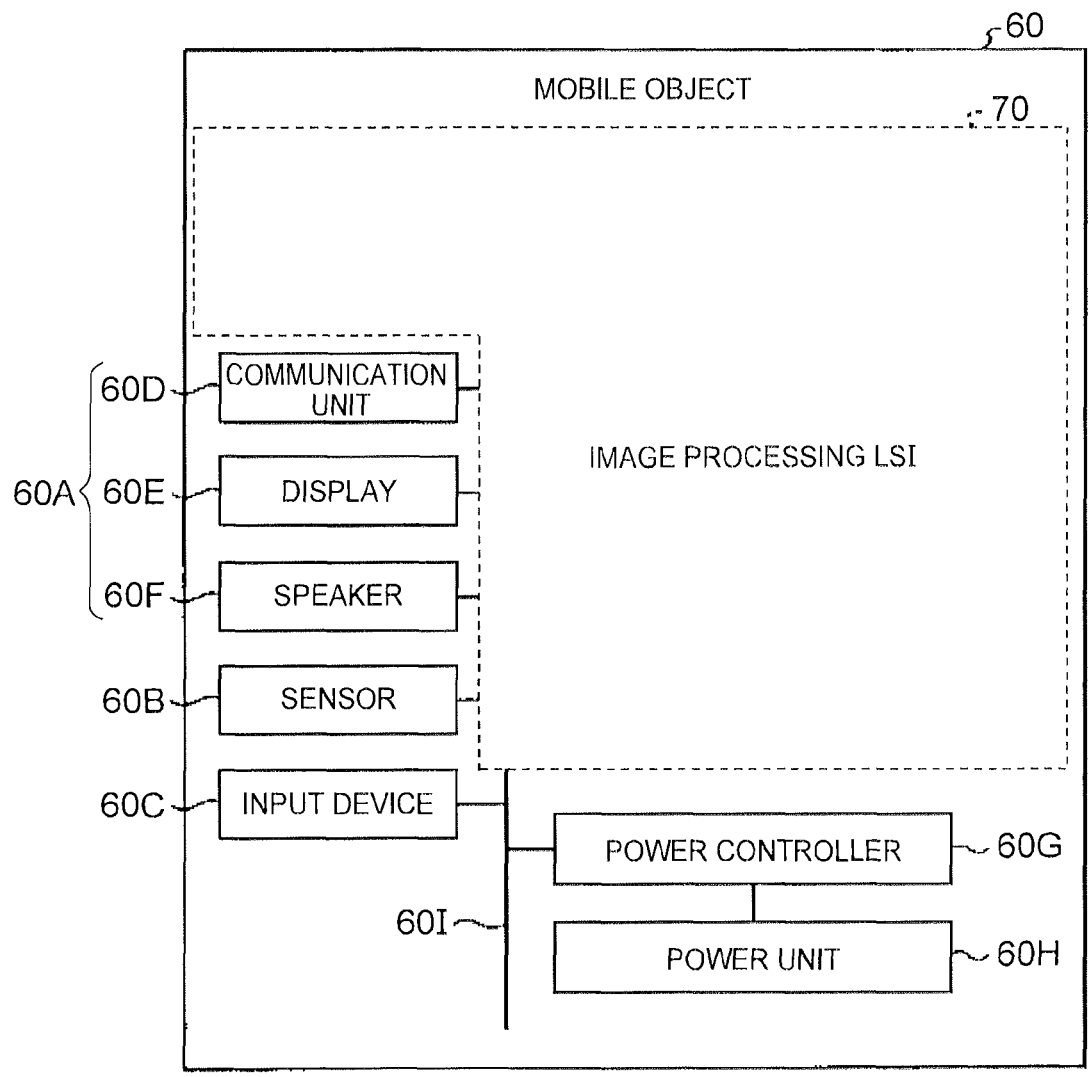
FIG. 11 is block diagram illustrating an example of an electrical configuration of a mobile object.

FIG. 11 is a block diagram illustrating an example of an electrical configuration of the mobile object 60.

The output unit 60A outputs various kinds of information. The output unit 60A includes, for example, a communication unit 60D, a display 60E, and a speaker 60F.

The communication unit 60D communicates with external apparatuses. The communication unit 60D transmits output information to the external apparatuses. In addition, the communication unit 60D receives road information and the like from the external apparatuses. The road information indicates a signal, a traffic sign, a surrounding building, a road width of each lane, the center line between lanes, and the like. The road information may be stored in an image processing chip or a memory provided in the mobile object.

The sensor 60B is a sensor that acquires a driving environment of the mobile object 60. The sensor 60B includes, for example, an external sensor and an internal sensor. The internal sensor monitors surveillance information such as an acceleration rate of the mobile object 60, a speed of the mobile object 60, an angular speed of the mobile object 60, for example. The external sensor monitors surrounding information of the mobile object 60. The external sensor may be mounted on the mobile object 60 or may be installed outside the mobile object 60 (for example, on another mobile object, an external apparatus, or the like).

The surrounding information is information indicating surrounding conditions of the mobile object 60. The surrounding information is, for example, a captured image of the surroundings of the mobile object 60, distance information, and the like. Here, the surrounding information may include positional information of the mobile object 60. The external sensor is, for example, an image capture device that obtains captured images by shooting, a distance sensor (millimeter wave radar, laser sensor, or range image sensor), a position sensor (global navigation satellite system (GNSS) or global positioning system (GPS)), a wireless communication device, or the like. The captured image is in the form of digital image data in which a pixel value is specified for each pixel, a depth map in which a distance from the sensor 60B is specified for each pixel, or the like. The laser sensor is, for example, a two-dimensional laser imaging detection and ranging (LIDAR) sensor which is installed in parallel with a horizontal plane, or three-dimensional LIDAR sensor.

The input device 60C receives various instructions and information inputs from a user. The input device 60C is, for example, a pointing device such as a mouse or trackball, an input device such as a keyboard, or the like. Alternatively, the input device 60C may be an input function in a touch panel, the input function provided integrally with the display 60E.

The power controller 60G controls the power unit 60H. The power unit 60H is a device which is mounted on and drives the mobile object 60. The power unit 60H is, for example, an engine, a motor, wheels, or the like.

The power unit 60H performs driving under the control of the power controller 60G. For example, the power controller 60G controls an acceleration level, a braking level, a steering angle, and the like by judging the surrounding conditions based on the output information generated by the image processing LSI 70, the information obtained from the sensor 60B, and the like.

The image processing LSI 70, the output unit 60A, the sensor 60B, the input device 60C, and the power controller 60G are connected to each other via a bus 60I. The power unit 60H is connected to the power controller 60G.

Figure 12:
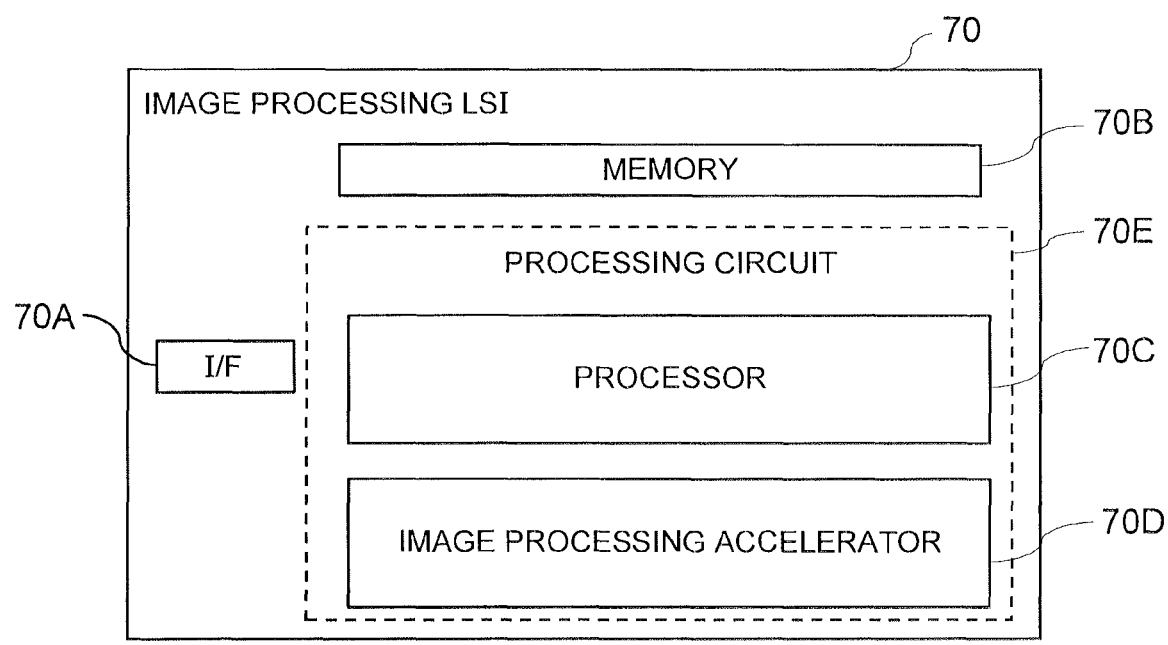
FIG. 12 is a block diagram illustrating an example of an image processing LSI.

FIG. 12 is a block diagram illustrating an example of the image processing LSI 70. The image processing LSI 70 includes an I/F 70A, a memory 70B, and a processor 70C. Here, the output unit 60A, the sensor 60B, the input device 60C, the power controller 60G, and the image processing LSI 70 are connected to each other via the bus 60I.

The I/F 70A is connected to a network (N/W) or the like with another system. In addition, the I/F 70A manages transmission and reception of information to and from the communication unit 60D. Information on a recognized object such as a person and information on a distance to the recognized object are outputted via the I/F 70A.

The memory 70B stores various kinds of data. The memory 70B is, for example, a random access memory (RAM), a ROM, or a semiconductor memory element such as a flash memory. The ROM holds necessary data and programs to be executed by the processor 70C. The RAM functions as a work area for the processor 70C. Here, the memory 70B may be provided outside the image processing LSI 70 or outside the mobile object 60.

Instead, the memory 70B may be a storage medium. Specifically, the storage medium may be a medium which stores or temporarily stores the programs and various kinds of information downloaded via a local area network (LAN) or the Internet.

Processing functions of the processor 70C are stored in the memory 70B in the form of programs executable by a computer. The processor 70C implements functions in accordance with each program by loading the program from the memory 70B and executing the program.

In the present embodiment, an image processing accelerator 70D is provided as a dedicated circuit, besides the processor 70C. A processing circuit 70E includes the processor 70C and the image processing accelerator 70D.

The processor 70C, the image processing accelerator 70D, the memory 70B, the I/F 70A, and a peripheral circuit (not illustrated) are connected to each other via a bus provided in the image processing LSI 70 but not illustrated.

Here, the image processing accelerator 70D may be incorporated into the processor 70C.

Various embodiments in. FIGS. 1 to 9 may be applied in the internal design of the image processing LSI 70 described in reference to FIGS. 10 to 12.

Although some embodiments have been described, these embodiments are presented as examples and are not intended to limit scope of the claims. These novel embodiments may be implemented in other various configurations, and various omissions, substitutions, and modifications may be made in a range not departing from the gist of the embodiments. These embodiments and modifications are included in the scope and spirit of the claims, and are within the scope of the appended claims or the equivalents thereof. Naturally, these embodiments may be partially combined as appropriate in the scope of the spirit of the embodiments.

What is claimed is:

1. A data transfer circuit comprising:
a measurement circuit that measures a transfer time of transfer data;
a data processing circuit that is connected to the measurement circuit, and that, when the transfer time exceeds a threshold, performs lossy compression to reduce a data volume; and
a control circuit that is connected to the data processing circuit, and that performs control to transfer data,
wherein the measurement circuit measures the transfer time for the transfer of the transfer data in each frame,
the data processing circuit performs output in each frame such that a reduction in the data volume of the transfer data decreases as a difference between a longest transfer time and a shortest transfer time among the transfer time in a predetermined number of past frames becomes larger, and the control circuit performs control to transfer the transfer data or the transfer data with the reduced data volume in each frame.

2. The data transfer circuit according to claim 1, wherein the measurement circuit measures a transfer time from start to end of transfer of transfer data.

3. The data transfer circuit according to claim 1, wherein the data processing circuit is connected to the measurement circuit, and when the transfer time exceeds a threshold, performs lossy compression on data belonging to a predetermined area in the transfer data to reduce a data volume.

4. The data transfer circuit according to claim 1, wherein the control circuit is connected to the data processing circuit, and performs control to transfer the transfer data or the transfer data with the reduced data volume based on an output of the data processing circuit.

5. The data transfer circuit according to claim 1, wherein when the transfer time exceeds a threshold, the data processing circuit increases a reduction in the data volume of the transfer data as a difference between the transfer time and the threshold becomes larger.

6. The data transfer circuit according to claim 1, wherein the data volume is reduced depending on a margin of a bandwidth.

7. The data transfer circuit according to claim 1, wherein the data processing circuit includes:
  a lossy compression circuit that performs lossy compression on the data belonging to a predetermined area in the transfer data; and
  an area setting circuit that sets a data area of the transfer data to be transferred by the control circuit such that data belonging to an area other than the predetermined area in the transfer data is to be transferred.

8. The data transfer circuit according to claim 7, wherein
the data processing circuit outputs the transfer data with the reduced data volume by selecting whether to perform the lossy compression or to set a data area to be transferred based on a value of a difference between the transfer time and the threshold.

* * * * *